Patented Feb. 6, 1951

2,541,003

UNITED STATES PATENT OFFICE 2,541,003

PROCESS FOR REACTING SALTS OF PHENOLS WITH HALO-ALKANOIC ACID COMPOUNDS

Harold M. Day, Stamford, and Margaret H. Bradley, Bridgeport, Conn., assignors to American Cyanamid Company, New York, N. Y., a corporation of Maine No Drawing. Application August 17, 1948, Serial No. 44,804

1 Claim. (Cl. 260—520)

This invention relates to a process for bringing about reaction between an alkali metal salt of a weakly acidic organic compound and an organic compound containing a reactive halogen atom. More particularly, it relates to an improved process for the preparation of isopropylidene-bis(p-phenoxyacetic acid) by reaction of an alkali metal salt of isopropylidene-di-(p-phenol) and an alkali metal haloacetate.

Taking the preparation of isopropylidene-bis-(p-phenoxyacetic acid) as an example, the reaction which, while itself a general one, forms the basis of our improved process, may be represented schematically as follows:

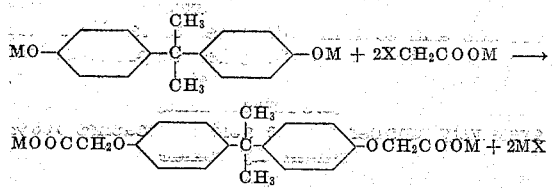

where M is an alkali metal and X is a halogen atom.

Poor yields of relatively impure product have previously been obtained when it has been attempted to prepare isopropylidene - bis (p-phenoxy-acetic acid) by means of the above reaction or when similar reactions between other alkali metal salts of weakly acidic organic compounds and alkali metal haloacetates have been attempted. We believe that the poor yields of relatively impure product are due to the fact that the alkali metal salt of the weakly acidic organic compound tends to be hydrolyzed, thus liberating free alkali in the reaction mixture which, in turn, causes hydrolysis of the alkali metal haloacetate to the corresponding glycollate. An obvious expedient to combat this loss of haloacetate by hydrolysis and consequent reduction in yield and quality of the desired product would seem to be the use of more than the stoichiometric quantity of haloacetate so that an excess would be present in the reaction mixture to replace that portion of the haloacetate which is hydrolyzed. However, we have found that use of an excess of haloacetate does not solve the problem except under certain conditions, and these certain conditions constitute the essence of the process of the present invention.

It is therefore an object of the present invention to provide a process for bringing about more efficient reaction between an alkali metal salt of a weakly acidic organic compound and an organic compound containing a reactive halogen atom.

Another object of the present invention is to provide a process for increasing the production yield and quality of the reaction product of an alkali metal salt of a weakly acidic organic compound and an alkali metal haloacetate.

It is further object of the present invention to so control the use of an amount of alkali metal haloacetate in excess of the stoichiometric quantity required for reaction with an alkali metal salt of a weakly acidic organic compound that increased yields of the desired reaction product are obtained.

More specifically, it is an object of the present invention to provide a process for the preparation of isopropylidene-bis (p-phenoxyacetic acid) of good purity and in high yield.

The above and other objects are attained by bringing about reaction between an alkali metal salt of a weakly acidic organic compound and an organic compound containing a reactive halogen atom attached to an aliphatic carbon atom by a process comprising the step-wise addition of alkali metal hydroxide and an excess of the organic compound containing a reactive halogen atom to the reaction mixture.

The invention will be described in greater detail in conjunction with the following specific examples in which proportions are given in parts by weight. It should be understood that the examples are merely illustrative, and it is not intended that the scope of the invention be limited to the details therein set forth.

EXAMPLE 1

Part A 114 parts of isopropylidene-di(p-phenol) (0.5 mol)
84.5 parts of sodium hydroxide, 97% (2.05 mols)
1000 parts of water
100 parts of chloroacetic acid (1.05 mols)
1 part of potassium iodide The isopropylidene-di(p-phenol) is dissolved in a solution of 41.5 parts of the sodium hydroxide in 500 parts of the water, the potassium iodide is added, and the solution is heated to reflux. The chloroacetic acid is neutralized with a solution of 43 parts of the sodium hydroxide in 500 parts of the water while maintaining the temperature below 50° C., and the sodium chloroacetate solution obtained is added to the refluxing solution of the sodium salt of isopropylidene-di(p-phenol). The reaction mixture is refluxed for three hours.

Part B 16.5 parts of sodium hydroxide, 97% (0.4 mol)
46.6 parts of sodium chloroacetate (0.4 mol)

To the reaction mixture of Part A are added 10.3 parts (0.25 mol) of the sodium hydroxide and a solution of 25 parts of chloroacetic acid (0.26 mol) and 10.5 parts of sodium hydroxide (0.26 mol) in 125 parts of water, and the heating under reflux is continued for an hour. 6.2 parts (0.15 mol) of sodium hydroxide and a neutral solution of 15.0 parts of chloroacetic acid and 6.5 parts of sodium hydroxide in 75 parts of water (0.16 mol of sodium chloroacetate) are then added, and refluxing is continued for an additional hour. A 96.5% by weight yield, based on the isopropylidene-di(p-phenol), of isopropylidene-bis-(p-phenoxyacetic acid) of 90.0% purity is obtained.

EXAMPLE 2

Part A

The procedure of Example 1 is followed.

Part B 13.7 parts of sodium hydroxide (0.33 mol)
38.4 parts of sodium chloroacetate (0.33 mol)

To the reaction mixture of Part A are added the sodium hydroxide and sodium chloroacetate in three portions, 0.20 mol of each, 0.08 mol of each, and 0.05 mol of each, respectively. Each addition is followed by an hour of heating at reflux temperature. A 97.0% yield, based on the weight of isopropylidene-di(p-phenol), of 90.5% pure isopropylidene bis-(p-phenoxyacetic acid) is obtained.

EXAMPLE 3

Part A

The exact procedure of Example 1 is followed.

Part B 15.8 parts of sodium hydroxide (0.38 mol)
44.3 parts of sodium chloroacetate (0.38 mol)

To the reaction mixture of Part A are added the sodium hydroxide and sodium chloroacetate as in Example 2, but in portions of 0.25 mol of each, 0.08 mol of each, and 0.05 mol of each, respectively. A 95.2% yield, based on the weight of isopropylidene-di(p-phenol), of 92.0% pure isopropylidene bis-(p-phenoxyacetic acid) is obtained.

EXAMPLE 4

Part A

The procedure of Example 1 is repeated.

Part B 20.0 parts of sodium hydroxide (0.5 mol)
58.3 parts of sodium chloroacetate (0.5 mol)

To the reaction mixture of Part A are added the sodium hydroxide and sodium chloroacetate as in Example 2, but in portions of 0.25 mol of each, 0.15 mol of each, and 0.10 mol of each, respectively. A 96.8% yield, on the same basis as in the foregoing examples, of 93.2% isopropylidene bis-(p-phenoxyacetic acid) is obtained.

The results of Examples 1–4 inclusive are set out in the following tables:

Part B

| Ex. | First addition | | | Second addition | | | Third addition | | |
|---|---|---|---|---|---|---|---|---|---|
| | NaOH, mol | ClCH$_2$COONa, mol | Reflux, hr. | NaOH, mol | ClCH$_2$COONa, mol | Reflux, hr. | NaOH, mol | ClCH$_2$COONa, mol | Reflux, hr. |
| 1 | 0.25 | 0.25 | 1 | 0.15 | 0.15 | 1 | | | |
| 2 | 0.20 | 0.20 | 1 | 0.08 | 0.08 | 1 | 0.05 | 0.05 | 1 |
| 3 | 0.25 | 0.25 | 1 | 0.08 | 0.08 | 1 | 0.05 | 0.05 | 1 |
| 4 | 0.25 | 0.25 | 1 | 0.15 | 0.15 | 1 | 0.10 | 0.10 | 1 |

| Example | Per Cent Yield | Per Cent Purity |
|---|---|---|
| 1 | 96.5 | 90.0 |
| 2 | 97.0 | 90.5 |
| 3 | 95.2 | 92.0 |
| 4 | 96.8 | 93.2 |

It will be apparent that successive retreatment of the reaction mixture with excess sodium hydroxide and sodium chloroacetate results in an increase in the purity of the desired product after each addition. The increment of increase in purity upon successive retreatments becomes progressively smaller as the acid approaches 100% purity. Excess sodium hydroxide and sodium chloroacetate added in one portion either before or after the initial reflux of theoretical quantities of the principal reactants does not result in the production of as pure isopropylidine bis(p-phenoxyacetic acid or of as much isopropylidene bis(p-phenoxyacetic acid) as when the excess is added in increments according to the process of the present invention.

While the invention is in no sense limited to our preferred embodiment, we prefer, for the practical preparation of isopropylidene bis(p-phenoxyacetic acid) of 90% or better purity, to use an excess of at least 50% of the amount of sodium chloroacetate used in the initial reaction. This excess is preferably added in three portions in the weight ratio of 5:3:2, but, as will be apparent from the preceding examples, neither the amount of the excess nor the number of portions in which it is added nor the weight ratio of the portions is invariable, although, generally speaking, the fewer the addition steps the larger the excess required to attain a given purity. Thus, in Example 1, a 40% excess is added in two portions in the ratio of 5:3, while in Example 2 a 33% excess is added in three portions in the ratio of 5:2:1.25 and in Example 3 a 38% excess is added in three portions in the ratio of 5:1.6:1. Example 4 represents the optimum in each respect, namely, a 50% excess added in three portions in the ratio of 5:3:2.

EXAMPLE 5

Part A 80.6 parts of 2,4-dichlorophenol (0.5 mol)
42.5 parts of sodium hydroxide, 97% (1.02 mol)
370 parts of water
49.5 parts of monochloroacetic acid (0.52 mol)
6 parts of potassium iodide The 2,4-dichlorophenol is dissolved in a solution of 21 parts of the sodium hydroxide in 100 parts of the water. The monochloroacetic acid is neutralized with a solution of 21.5 parts of the sodium hydroxide in 270 parts of the water while maintaining the temperature below 50° C., and the neutralized solution is added to the prepared solution of the sodium salt of the 2,4-dichlorophenol. The potassium iodide is then added, and the resulting reaction mixture is refluxed for 3½ hours.

Part B 13 parts of sodium hydroxide (0.33 mol)
450 parts of water
14 parts of monochloroacetic acid (0.15 mol)

Five parts (0.13 mol) of the sodium hydroxide in 250 parts of the water and a solution of 9 parts (0.1 mol) of the monochloroacetic acid and 4 parts (0.1 mol) of the sodium hydroxide in 150 parts of the water are added to the refluxed reaction mixture of Part A, and refluxing is continued for 1½ hours. Two parts (0.05 mol) of the sodium hydroxide and a solution of 5 parts (0.05 mol) of the monochloroacetic acid and 2 parts (0.05 mol) of the sodium hydroxide in 50 parts of water are then added, and refluxing is continued for two additional hours. The reaction mixture is then neutralized with 50 parts of sulfuric acid in 234 parts of water, and the product is washed with water and dried at 80° C. An 84.9% yield, on the basis of the 2,4-dichlorophenol, of 99.3% dichlorophenoxyacetic acid is obtained.

The reaction involved in the preparation according to this example may be represented as follows:

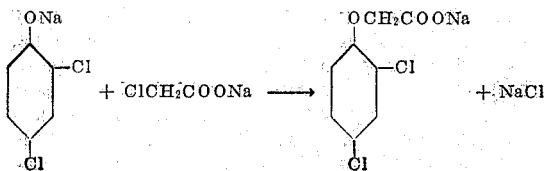

EXAMPLE 6

Part A 37 parts of 2-benzothiazolol (0.25 mol)
20.2 parts of sodium hydroxide (0.5 mol)
150 parts of water
25.5 parts (0.25 mol) of monochloroacetic acid A solution of the 2-benzothiazolol and 10.1 parts of the sodium hydroxide in the water is heated nearly to reflux, whereupon an aqueous neutral solution of the chloroacetic acid and the remaining sodium hydroxide is introduced. The reaction mixture is then refluxed for 3 hours.

Part B 8.4 parts of sodium hydroxide (0.21 mol)
10.5 parts of chloroacetic acid (0.11 mol)

2.8 parts (0.07 mol) of the sodium hydroxide and an aqueous solution of 2.8 parts of the sodium hydroxide and 7 parts of chloroacetic acid (0.07 mol of sodium chloroacetate) are added to the refluxed reaction mixture of Part A, and refluxing is continued for 1 hour. 1.4 parts of the sodium hydroxide and an aqueous solution of 3.5 parts of the chloroacetic acid and the remaining 1.4 parts of the sodium hydroxide are added, and refluxing is again continued for 1 hour.

The reaction mixture is finally clarified with decolorizing carbon, i. e., Darco, and the desired 2-benzothiazolyloxyacetic acid is precipitated with sulfuric acid. A 66.7% yield of product melting at 174° C. is obtained.

The reaction involved in this example may be represented by the following chemical equation:

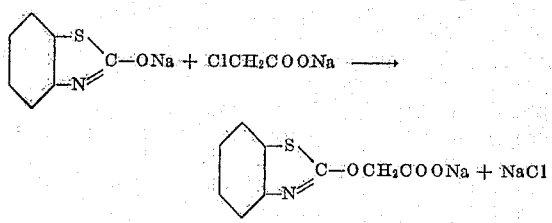

2-benzothiazolol used as the starting material may be prepared by oxidation of 2-benzothiazolethiol

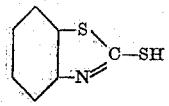

(well known by the trade name "Captax") with sodium hypochlorite in the presence of sodium hydroxide to the corresponding sulfonic acid, as described in U. S. Patent No. 2,018,813. The sulfonic acid is readily hydrolyzable to the desired hydroxy compound by heating with a mineral acid.

The process of the present invention is, of course, not limited to the chloroacetic acid or alkali metal salt thereof used in the specific examples. Any organic compound containing an active halogen atom attached to an aliphatic carbon may be used. Examples of such compounds include the alkylene halohydrins such as ethylene chlorohydrin, glycerol dichlorohydrin, ethylene bromohydrin, etc., halogenated acids and esters thereof, particularly the α-halogenated acids, such as bromoacetic acid, iodoacetic acid, fluoroacetic acid, α- and β-chloropropionic acids, α-chloroisobutyric acid, ethyl chloroacetate, phenyl α-bromopropionate, benzyl fluoroacetate, etc., saturated and unsaturated alkyl and aralkyl halides such as methyl chloride, ethyl bromide, n-propyl iodide, allyl chloride, benzyl chloride, etc., alkylene halides such as ethylene dichloride, 1,3-dibromopropane, 1,2-diiodopropane, 1,3-dichloro-n-butane, etc., halogenated acid amides such as chloroacetamide, bromopropionamide, N-methyliodoacetamide, N-benzyl-chloroacetamide, N-phenyl-chloroacetamide, N,N'-dimethyl-bromoacetamide, etc., halogenated nitriles such as chloroacetonitrile, β-bromopropionitrile, α-fluorobutyronitrile, etc., halogenated ethers such as monochlorodimethyl ether, di(bromomethyl) ether, iodomethyl ethyl ether, mono-α-fluorodiethyl ether, etc., sulfur analogs of the above compounds such as β-chloroethyl mercaptan, chlorothioacetic acid, ethyl bromothioacetate, chlorodithioacetic acid, methyl iododithioacetate, monofluorodimethyl sulfide, di(β-chloroethyl) sulfide, etc., and the like.

Similarly, the present invention is not limited to the use of the sodium salts of the reactants and to the addition in the final stages of sodium hydroxide, but the salts and hydroxides of other alkali metals may be used. Thus, for example, potassium hydroxide, lithium hydroxide and the like may be substituted for part or all of the sodium hydroxide of the examples.

The specific examples have given three representative types of weakly acidic organic compounds to which the process of the present invention applies; in general, any weakly acidic organic compound which will form an alkali metal salt is useful in the process of the present invention. Compounds of the phenolic or enolic type are generally preferred, the process of the present invention therefore being applicable to the alkali metal salts of such compounds as phenol itself, alkyl substituted phenols such as cresol, xylenol, etc., halogenated phenols, cresols, xylenols and the like, such as 2-chlorophenol, 4-bromophenol, 2-methyl-4-fluorophenol, 2,4-dibromo-6-ethylphenol, etc., polyhydric phenols such as resorcinol, phloroglucinol, pyrocatechol, pyrogallol, etc., thiophenols such as thiophenol itself, the thiocresols, 2-chlorothiophenol, 2,4-dibromthiophenol, etc., nitrophenols such as nitrophenol itself, the nitrocresols, 2-chloro-4-nitrophenol, etc., 4,4'-dihydroxydiphenyl and substitution products thereof such as 3,3'-difluoro-4,4'-dihydroxydiphenyl, etc., 2-mercaptobenzothiazole, mercaptothiazole, 4,4'-dihydroxydiphenyl sulfone, acetoacetic acid esters such as ethyl acetoacetate, methyl alpha-bromoacetoacetate, etc., acetylacetone, acetoacetaldehyde, esters of malonic acid such as ethyl malonate, etc., mercapto- and hydroxy-oxazoles and imidazoles, and the like.

In the examples, the portions of excess organic compound containing a reactive halogen atom and alkali metal hydroxide are added together in balanced amounts at intervals separated by additional refluxing of the reaction mixture. Providing that the excess reagents are added in balanced amounts, the order of addition of these reagents is not critical and is determined only by convenience of handling. Thus, if it is not particularly convenient to add the increments of both the halogen-containing material and the alkali metal hydroxide at intervals, the alkali metal hydroxide may be added at intervals with equivalent amounts of the halogen-containing compound added slowly and continuously to the reaction mixture. Alternatively, the halogen-containing material may be added at intervals and equivalent amounts of the alkali metal hydroxide introduced slowly and continuously. Furthermore, it is possible to obtain satisfactory results by simultaneously adding equivalent proportions of alkali metal hydroxide and the organic compound containing an active halogen atom slowly and continuously at controlled rates. Thus, it is quite apparent that the order or manner of addition of the excess reactants has no effect on either the yield or purity of the desired reaction product so long as the total excess quantity of neither of the reactants is added all at once.

It has been stated that excess quantities of alkali metal hydroxide and halogen-containing compound are necessarily added to the reaction mixture in order that high yields of good product be obtained because of the hydrolysis of the halogen-containing compound which takes place under the influence of alkali metal hydroxide liberated by hydrolysis of the alkali metal salt of the weakly acidic organic compound. Therefore, the amount of excess of reagents which must be added in each step of the process following the initial reaction between stoichiometric quantities of the two ingredients is dependent upon the extent of hydrolysis occurring in the reaction of the step just preceding the addition in question. Accordingly, the quantity added in any one step must be at least equivalent to the extent of hydrolysis in the preceding step. For example, in the case of the reaction of Examples 1-4 inclusive, the initial reaction mixture, after reflux, contains about 60% of the sodium salt of the desired bis acid and about 40% of the sodium salt of an acid having the formula

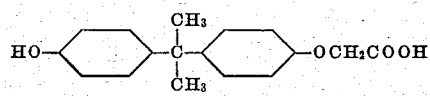

The first addition thereafter of sodium hydroxide and sodium chloroacetate must therefore represent at least a 20% excess over the original quantities. After refluxing, the reaction mixture contains 84% bis acid and 16% of the mono acid; accordingly, at least an 8% excess of reagents must be added in the next step. And so the amount of excess is determined for each subsequent step. While use of the minimum excess results in a satisfactory product within the scope of the present invention, i. e., nearly theoretical yield of bis acid of at least 90% purity as borne out by Example 2 in which the minimum quantities were used, we prefer using slightly more than the minimum excess. There is no theoretical upper limit to the amount of excess over and above the minimum; practical and commercial considerations control. The upper limit is determined empirically in each case and is represented by the point at which a greater excess effects little or no increase in purity. The purity may, of course, be readily determined at each step by titration or any other suitable means.

The invention is not limited to the addition of the excess reagents in any particular number of increments. Here again the number of portions necessary will depend at least in part on the extent of undesirable hydrolysis occurring in the main reaction. In order to obtain an optimum degree of purity in good yield, the excess reagents must be added in at least two portions, they are preferably added in three portions, and they may be added in any number of additional portions. Obviously, the greater the number of steps in which the three reagents are added, the greater the purity of the product obtained up to a certain point, but in practical commercial operation a balance, of course, must be sought between the degree of purity necessary and the cost of additional time and handling occasioned by an unnecessarily large number of additions.

The process of the present invention may be carried out in aqueous or alcoholic media.

The principal advantage of the present invention resides in the fact that by its application pure reaction products of alkali metal salts of weakly acidic organic compounds and organic compounds containing active halogen atoms may be prepared in high yield. The commercial and practical advantages of a process giving high yields of desired product are, of course, obvious. In many cases, an impure product of one kind or another serves a particular purpose just as well as the same product in a highly purified form, and in such cases the process of the present invention would be of no great commercial value. There are many cases, however, where the purity of a product is extremely critical, and in such cases the process of the present invention is most advantageous. For example, the isopropylidene bis(p-phenoxyacetic acid) of Examples 1–4 may be used in the preparation of alkyd resins. A large amount of the monobasic acid

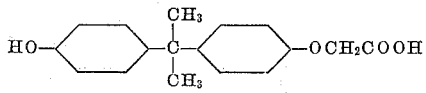

is produced if merely stoichiometric quantities of the sodium salt of isopropylidene di(p-phenol) and sodium chloroacetate are used or if an excess of the chloroacetate is added in one portion either before or after the initial reaction. Difficult and costly purification steps are required to separate the desired dibasic acid from admixture with the monobasic acid. This monobasic acid is an undesirable impurity because its presence destroys the desirable properties of resins prepared by condensation with a polyhydric alcohol.

2-benzothiazolyloxyacetic acid is useful as a plant growth regulant; 2-benzothiazolol has no such property. If the steps of the present process are not applied in the preparation of the former by reaction of the latter with sodium chloroacetate, the product will contain as an impurity a fairly large amount of the 2-benzothiazolol which not only lowers the yield of the desired product having plant growth regulant properties, but also its effectiveness per unit weight.

It is another advantage of the present invention that by adding excess reactants in small increments, the amounts of each increment being determined by the extent of hydrolysis of the alkali metal salt of the halogen-containing organic compound in the reaction stage just preceding the addition, the production of a product of extremely high purity in very high yield with the smallest amount of excess reactants is made possible.

A further advantage of the present invention is that its process makes unnecessary any time-consuming and expensive purifications of reaction products in cases where a product of high purity is either desirable or necessary.

We claim:

A process which comprises heating together stoichiometric quantities of an alkali metal salt of isopropylidene di(p-phenol) and chloroacetic acid for a sufficient time to bring about an initial reaction between the two ingredients, introducing into the reaction mixture alkali metal hydroxide and additional chloroacetic acid in at least two portions, the amount of each portion depending upon the extent to which the chloroacetic acid has been hydrolyzed in the previous reaction stage, and heating the reaction mixture after each of said introductions.

HAROLD M. DAY.
MARGARET H. BRADLEY.

REFERENCES CITED

The following references are of record in the file of this patent:

UNITED STATES PATENTS

| Number | Name | Date |
| --- | --- | --- |
| 2,083,482 | Steindorff et al. | June 8, 1937 |
| 2,158,064 | Carothers | May 16, 1939 |
| 2,252,666 | Reiff et al. | Aug. 12, 1941 |
| 2,322,761 | Lontz | June 29, 1943 |
| 2,370,256 | Niederl | Feb. 27, 1945 |
| 2,375,138 | Salvin et al. | May 1, 1945 |
| 2,375,885 | Babcock | May 15, 1945 |
| 2,444,594 | Day et al. | July 6, 1948 |

FOREIGN PATENTS

| Number | Country | Date |
| --- | --- | --- |
| 573,476 | Great Britain | Nov. 22, 1945 |
| 573,510 | Great Britain | Nov. 23, 1945 |
| 592,827 | Great Britain | Sept. 30, 1947 |

OTHER REFERENCES

Pokorny: J. Am. Chem. Soc., vol. 63, p. 1768 (1941).

Berhenke et al.: Ind. Eng. Chem., vol. 38, pp. 544–546 (1946).